(12) United States Patent
Nguyen et al.

(10) Patent No.: US 10,407,611 B2
(45) Date of Patent: Sep. 10, 2019

(54) HEAVY OIL RHEOLOGY MODIFIERS FOR FLOW IMPROVEMENT DURING PRODUCTION AND TRANSPORTATION OPERATIONS

(71) Applicant: Ecolab USA Inc., St. Paul, MN (US)

(72) Inventors: Duy T. Nguyen, Sugar Land, TX (US); John J. Ibagon, Bogota (CO); Vittoria Balsamo De Hernandez, Fulshear, TX (US); Tyler D. Boyd, Houston, TX (US); Joseph Paul Bailey, Cundinamarca (CO)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/400,373

(22) Filed: Jan. 6, 2017

(65) Prior Publication Data
US 2017/0198204 A1    Jul. 13, 2017

Related U.S. Application Data

(60) Provisional application No. 62/276,501, filed on Jan. 8, 2016.

(51) Int. Cl.
| | | |
|---|---|---|
| *C09K 8/58* | (2006.01) | |
| *C09K 8/588* | (2006.01) | |
| *F17D 1/16* | (2006.01) | |
| *F17D 1/17* | (2006.01) | |

(52) U.S. Cl.
CPC .............. *C09K 8/588* (2013.01); *C09K 8/58* (2013.01); *F17D 1/16* (2013.01); *F17D 1/17* (2013.01)

(58) Field of Classification Search
CPC .................................. C09K 8/588; F17D 1/16
See application file for complete search history.

(56) References Cited

U.S. PATENT DOCUMENTS

| | | | | |
|---|---|---|---|---|
| 4,260,019 A | * | 4/1981 | Blair, Jr. ............... | C09K 8/588 166/275 |
| 4,414,035 A | | 11/1983 | Newberry et al. | |

(Continued)

FOREIGN PATENT DOCUMENTS

| | | |
|---|---|---|
| CN | 1376757 | 4/2002 |
| CN | 101210173 A | 7/2008 |

(Continued)

OTHER PUBLICATIONS

Ahmed, Affan, Rheological Changes in Crude Oil Diluted with Alcohols, M. Eng. Thesis, Halifax, Nova Scotia (Feb. 2013), 70 pages.

(Continued)

*Primary Examiner* — Ellen M McAvoy
(74) *Attorney, Agent, or Firm* — Stinson LLP (57) ABSTRACT

The present invention generally relates to methods for enhancing production and transportation of heavy and extra-heavy crude oil and for reducing the growth of asphaltene flocculants or hindering their formation, the methods comprising contacting an oil-soluble composition that comprises polyetheramines, tallow amines, tallow diamines, alkylphenol-formaldehyde resins, reaction products of alpha-olefin, maleic anhydride and pentaerythritol, or a combination thereof, with the heavy or extra-heavy crude oil.

14 Claims, 8 Drawing Sheets

(56) References Cited

U.S. PATENT DOCUMENTS

| | | | |
|---|---|---|---|
| 4,814,094 A * | 3/1989 | Blair, Jr. | C08G 8/36 |
| | | | 166/275 |
| 5,143,594 A | 9/1992 | Stephenson et al. | |
| 5,214,224 A | 5/1993 | Corner et al. | |
| 5,494,607 A * | 2/1996 | Manek | C09K 8/524 |
| | | | 166/304 |
| 5,693,257 A * | 12/1997 | Hart | B01D 17/047 |
| | | | 208/188 |
| 5,868,945 A | 2/1999 | Morrow et al. | |
| 5,925,233 A * | 7/1999 | Miller | C10G 75/04 |
| | | | 208/265 |
| 6,178,980 B1 | 1/2001 | Storm | |
| 6,228,830 B1 | 5/2001 | Vlasblom | |
| 6,402,934 B1 | 6/2002 | Chheda et al. | |
| 8,342,198 B2 * | 1/2013 | Asomaning | C10M 145/20 |
| | | | 137/13 |
| 8,575,082 B2 * | 11/2013 | Asomaning | C10M 145/20 |
| | | | 208/22 |
| 8,695,707 B2 | 4/2014 | Li et al. | |
| 8,921,478 B2 | 12/2014 | Conrad et al. | |
| 9,637,676 B2 * | 5/2017 | Leonard | C09K 8/524 |
| 2010/0056408 A1 | 3/2010 | Asomaning et al. | |
| 2011/0315604 A1 * | 12/2011 | Nguyen | B01D 17/047 |
| | | | 208/188 |
| 2013/0096043 A1 | 4/2013 | Asomaning et al. | |
| 2014/0144810 A1 | 5/2014 | Schrader | |
| 2015/0011453 A1 * | 1/2015 | Bennett | C11D 3/2006 |
| | | | 510/402 |
| 2017/0198194 A1 * | 7/2017 | Leonard | C09K 8/524 |

FOREIGN PATENT DOCUMENTS

| | | |
|---|---|---|
| CN | 101724438 A | 6/2010 |
| CN | 101851493 A | 10/2010 |
| CN | 102352228 A | 2/2012 |
| CN | 103045223 A | 4/2013 |
| CN | 103087283 A | 5/2013 |
| WO | 2012/128910 A1 | 9/2012 |
| WO | 2013/041143 A1 | 3/2013 |

OTHER PUBLICATIONS

Chavez-Miyauchi, Tomas Eduardo et al., Aromatic Polyisobutylene Succinimides as Viscosity Reducers with Asphaltene Dispersion Capability for Heavy and Extra-Heavy Crude Oils, Energy & Fuels, ACS Publications, 2013 American Chemical Society, pp. 1994-2001.

Hegazey R.M. et al, Dispersion of Asphaltene Precipitation in Egyptian Crude Oil Using Corrosion Inhibitors, Petroleum Science and Technology, 32 (2014), pp. 2337-2344.

Kelland, Malcolm A., Production Chemicals for the Oil and Gas Industry, 2nd edition (2014), pp. 134-136.

International Search Report relating to PCT Application No. PCT/US2017/012510 dated Apr. 18, 2017, 6 pages.

Written Opinion relating to PCT Application No. PCT/US2017/012510 dated Apr. 18, 2017, 8 pages.

* cited by examiner

HEAVY OIL RHEOLOGY MODIFIERS FOR FLOW IMPROVEMENT DURING PRODUCTION AND TRANSPORTATION OPERATIONS

CROSS-REFERENCE TO RELATED APPLICATION

This application claims priority to U.S. Provisional Patent Application Ser. No. 62/276,501 filed on Jan. 8, 2016, the disclosure of which is incorporated herein by reference in its entirety.

FIELD OF THE INVENTION

The present invention generally relates to methods for enhancing the production and transportation of crude oil, by contacting the crude oil with an oil-soluble composition that reduces the viscosity of the crude oil.

BACKGROUND OF THE INVENTION

Many challenges arise in the production, transportation, and refining of heavy and extra-heavy crude oil as compared to light crude oil. The high viscosity of heavy and extra-heavy crude oil results in the need for alternative methods of extraction, e.g., steam injection. Additionally, the increased viscosity renders it difficult to flow through pipelines. Further, asphaltenes and paraffins within the heavy and extra-heavy crude oil can create deposits which can pose numerous problems. As a result, these crude oils pose an economic challenge to produce.

Commonly, a diluent is added continuously or at regular intervals during the production and transportation processes to maintain the flowability of the heavy and extra-heavy oil. Various diluents can be used for reducing the viscosity; however, the type of diluent determines the amount needed. For example, more synthetic crude oil is needed as compared to natural gas condensate to achieve the same viscosity reduction. The addition of more diluent can be a challenge in the refinement process, and represents a significant operational cost.

The viscosity of the crude oil has an impact on several operating characteristics including pump pressure and temperature. A method for reducing the viscosity of crude oil is to increase the operating and transportation temperatures to maintain the liquid state of the crude oil; however, this increases the cost of production.

Asphaltenes are highly prevalent in heavy and extra-heavy crude oils, thus requiring special attention during the extraction and processing of these crude oils. Asphaltene deposits can block reservoir pores in near-well formations, production tubing, and downstream pipelines.

Therefore, a need exists to develop alternative methods and chemistries for reducing the viscosity of heavy and extra-heavy crude oils.

SUMMARY OF THE INVENTION

One aspect of the invention is directed to a method for enhancing the production or transportation of crude oil, the method comprising contacting the crude oil with an oil-soluble composition defined below, wherein the composition reduces the viscosity of the crude oil. The oil-soluble composition can comprise (a) an alkoxylated t-butyl-nonyl phenol formaldehyde resin, an alkoxylated t-butyl phenol formaldehyde resin, an alkoxylated trimethylolpropane, a nonyl phenol formaldehyde resin, a dinonyl-nonyl phenol formaldehyde resin, a nonyl phenyl polyetheramine, an ethoxylated tallow diamine, an ethoxylated tallow amine, a polyisobutylene succinic anhydride pentaerithrytol diester, a reaction product of α-olefin, maleic anhydride and pentaerithrytol, alkoxylated EPON-PPG polycondensate, dodecylbenzenesulfonic acid, or a combination thereof, and (b) at least one of a xylene-containing asphaltene solvent, a limonene-containing asphaltene solvent, an aromatic solvent, an alcohol, or a combination thereof. Provided that when the oil-soluble composition comprises an alkoxylated t-butyl-nonyl phenol formaldehyde resin, ethoxylated tallow amine, and dodecylbenzenesulfonic acid, or when the oil-soluble composition comprises an alkoxylated t-butyl-nonyl phenol formaldehyde resin, and an alkoxylated poly(bisphenol A diglycidyl ether), the total concentration of heavy aromatic naphtha, diesel, or heavy aromatic naphtha and diesel is less than 65 wt. %.

A further aspect of the invention is directed to an oil-soluble composition comprising an alkoxylated t-butyl-nonyl phenol formaldehyde resin, an alkoxylated t-butyl phenol formaldehyde resin, an alkoxylated trimethylolpropane, a nonyl phenol formaldehyde resin, a dinonyl-nonyl phenol formaldehyde resin, a nonyl phenyl polyetheramine, an ethoxylated tallow diamine, an ethoxylated tallow amine, a polyisobutylene succinic anhydride pentaerithrytol diester, a reaction product of α-olefin, maleic anhydride and pentaerithrytol, alkoxylated EPON-PPG polycondensate, dodecylbenzenesulfonic acid, or a combination thereof, and at least one of a xylene-containing asphaltene solvent, a limonene-containing asphaltene solvent, an aromatic solvent, an alcohol, or a combination thereof. When the oil-soluble composition comprises an alkoxylated t-butyl-nonyl phenol formaldehyde resin, ethoxylated tallow amine, and dodecylbenzenesulfonic acid, or when the oil-soluble composition comprises an alkoxylated t-butyl-nonyl phenol formaldehyde resin, and an alkoxylated poly(bisphenol A diglycidyl ether), the total concentration of heavy aromatic naphtha, diesel, or heavy aromatic naphtha and diesel is less than 65 wt. %.

Another aspect of the invention is a method for enhancing the production and transportation of crude oil, the method comprising contacting the crude oil with an oil-soluble composition, wherein the composition reduces the viscosity of the crude oil, the oil-soluble composition comprises from about 10 wt. % to about 50 wt. % of an alkoxylated t-butyl-nonyl phenol formaldehyde resin, from about 2 wt. % to about 20 wt. % of a nonyl phenol formaldehyde resin, and further comprises a nonyl phenol formaldehyde resin, a dinonyl-nonyl phenol formaldehyde resin, a nonyl phenyl polyetheramine, an ethoxylated tallow diamine, an ethoxylated tallow amine, a xylene-containing asphaltene solvent, a limonene-containing asphaltene solvent, a polyisobutylene succinic anhydride pentaerithrytol diester, a reaction product of α-olefin, maleic anhydride and pentaerithrytol, dodecylbenzenesulfonic acid, an aromatic solvent, an alcohol or a combination thereof.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

The present invention is directed towards a method for enhancing the production of crude oil, the method comprising contacting the crude oil with an oil-soluble composition, wherein the composition reduces the viscosity of crude oil. The oil-soluble composition can comprise an alkoxylated t-butyl-nonyl phenol formaldehyde resin, an alkoxylated t-butyl phenol formaldehyde resin, an alkoxylated trimethylolpropane, an alkoxylated poly(bisphenol A diglycidyl ether), a nonyl phenol formaldehyde resin, a dinonyl-nonyl phenol formaldehyde resin, an nonyl phenyl polyetheramine, an ethoxylated tallow diamine, an ethoxylated tallow amine, a polyisobutylene succinic anhydride pentaerithrytol diester, a reaction product of α-olefin, maleic anhydride and pentaerithrytol, dodecyl benzene sulfonic acid, or a combination thereof. When the oil-soluble composition comprises an alkoxylated t-butyl-nonyl phenol formaldehyde resin, ethoxylated tallow amine, and dodecylbenzenesulfonic acid, or when the oil-soluble composition comprises an alkoxylated t-butyl-nonyl phenol formaldehyde resin, and an alkoxylated poly(bisphenol A diglycidyl ether), the total concentration of heavy aromatic naphtha, diesel, or heavy aromatic naphtha and diesel is less than 65 wt. %.

For the methods described herein, the oil-soluble composition can comprise an alkoxylated t-butyl-nonyl phenol formaldehyde resin, an alkoxylated t-butyl phenol formaldehyde resin, an alkoxylated trimethylolpropane, a nonyl phenol formaldehyde resin, a dinonyl-nonyl phenol formaldehyde resin, a nonyl phenyl polyetheramine, an ethoxylated tallow diamine, an ethoxylated tallow amine, a polyisobutylene succinic anhydride pentaerithrytol diester, a reaction product of α-olefin, maleic anhydride and pentaerithrytol, or a combination thereof.

The oil-soluble composition can further comprise a solvent and the solvent can be a xylene-containing asphaltene solvent, a limonene-containing asphaltene solvent, an aromatic solvent, an alcohol, or a combination thereof.

The crude oil can be heavy or extra-heavy and can have an API gravity of from about 5 to about 20; from about 5 to about 19; from about 5 to about 18; from about 5 to about 17; from about 5 to about 16; from about 6 to about 20; from about 6 to about 19; from about 6 to about 18; from about 6 to about 17; from about 6 to about 18; from about 6 to about 17; preferably, the crude oil can have an API gravity of from about 6 to about 16.

The oil-soluble composition preferably can reduce the size of the asphaltene aggregates or hinder their formation.

The methods described herein can have a solvent of an aromatic solvent, an alcohol, or a combination thereof.

The aromatic solvent can comprise a heavy aromatic naphtha, toluene, xylene, light diesel, quinoline, or a combination thereof.

The alcohol can comprise ethylene glycol monobutyl ether, a linear or branched $C_2$-$C_8$ alcohol, or a combination thereof.

The oil-soluble composition can reduce the viscosity of crude oil by from about 5% to about 65%, from about 10% to about 65%, from about 15% to about 65%, from about 20% to about 65%, from about 25% to about 65%, from about 30% to about 65%, from about 35% to about 65%, from about 40% to about 65%, or from about 45% to about 65%, in downstream and upstream production as compared to an otherwise identical crude oil not contacted with the oil-soluble composition. The viscosity can be measured at a temperature from about 35° C. to about 75° C., from about 40° C. to about 75° C., from about 45° C. to about 75° C., from about 50° C. to about 75° C., at about 54° C., or at about 71° C.

The oil-soluble composition can also reduce the viscosity of crude oil by from about 5% to about 65%, from about 10% to about 65%, from about 15% to about 65%, from about 20% to about 65%, from about 25% to about 65%, from about 30% to about 65%, from about 35% to about 65%, from about 40% to about 65%, or from about 45% to about 65%, in transportation pipelines as compared to an otherwise identical crude oil not contacted with the oil-soluble composition. The viscosity can be measured at a temperature from about 35° C. to about 75° C., from about 40° C. to about 75° C., from about 45° C. to about 75° C., from about 50° C. to about 75° C., at about 54° C., or at about 71° C.

The oil-soluble composition can comprise nonyl phenyl polyetheramine and at least one of an alkoxylated t-butyl-nonyl phenol formaldehyde resin, an alkoxylated poly(bisphenol A diglycidyl ether), an alkoxylated t-butyl phenol formaldehyde resin, a nonyl phenol formaldehyde resin, or a dinonyl-nonyl phenol formaldehyde resin.

The oil-soluble composition can comprise nonyl phenyl polyetheramine and at least one of an alkoxylated t-butyl-nonyl phenol formaldehyde resin, a nonyl phenol formaldehyde resin, or a dinonyl-nonyl phenol formaldehyde resin.

The oil-soluble composition can comprise from about 5 wt. % to about 30 wt. % of a nonyl phenyl polyetheramine, and from 0 wt. % to about 25 wt. % of an alkoxylated t-butyl-nonyl phenol formaldehyde resin, from 0 wt. % to about 15 wt. % of an alkoxylated poly(bisphenol A diglycidyl ether), from 0 wt. % to about 10 wt. % of an alkoxylated t-butyl phenol formaldehyde resin, from 0 wt. % to about 35 wt. % of a nonyl phenol formaldehyde resin, or from about 0 to about 35 wt. % of a dinonyl-nonyl phenol formaldehyde resin, wherein at least one of the alkoxylated t-butyl-nonyl phenol formaldehyde resin, the alkoxylated poly(bisphenol A diglycidyl ether), alkoxylated t-butyl phenol formaldehyde resin, the nonyl phenol formaldehyde resin, or the dinonyl-nonyl phenol formaldehyde resin has a concentration greater than zero.

The oil-soluble composition can comprise from about 5 wt. % to about 30 wt. % of a nonyl phenyl polyetheramine, and from 0 wt. % to about 25 wt. % of an alkoxylated t-butyl-nonyl phenol formaldehyde resin, from 0 wt. % to about 35 wt. % of a nonyl phenol formaldehyde resin, or from about 0 to about 35 wt. % of a dinonyl-nonyl phenol formaldehyde resin, wherein at least one of the alkoxylated t-butyl-nonyl phenol formaldehyde resin, the nonyl phenol formaldehyde resin, or the dinonyl-nonyl phenol formaldehyde resin has a concentration greater than zero.

Further, the oil-soluble composition can comprise an alkoxylated t-butyl-nonyl phenol formaldehyde resin, a nonyl phenyl polyetheramine, a limonene-containing asphaltene solvent, a reaction product of α-olefin, maleic anhydride and pentaerithrytol, and dodecylbenzenesulfonic acid.

For the methods described herein, the oil-soluble composition can comprise from about 5 wt. % to about 25 wt. % of alkoxylated t-butyl-nonyl phenol formaldehyde resin, from about 5 wt. % to about 15 wt. % of nonyl phenyl polyetheramine, from about 50 wt. % to about 80 wt. % of limonene-containing asphaltene solvent, from about 5 wt. % to about 15 wt. % of reaction product of α-olefin, maleic anhydride and pentaerithrytol, and from about 0.1 wt. % to about 1 wt. % dodecylbenzenesulfonic acid.

The oil-soluble composition can comprise an alkoxylated t-butyl-nonyl phenol formaldehyde resin, a nonyl phenyl polyetheramine, a xylene-containing asphaltene solvent, polyisobutylene succinic anhydride pentaerithrytol diester, and dodecylbenzenesulfonic acid.

Additionally, the oil-soluble composition can comprise from about 5 wt. % to about 25 wt. % of alkoxylated t-butyl-nonyl phenol formaldehyde resin, from about 5 wt. % to about 15 wt. % of nonyl phenyl polyetheramine, from about 50 wt. % to about 80 wt. % of xylene-containing asphaltene solvent, from about 5 wt. % to about 15 wt. % of polyisobutylene succinic anhydride pentaerithrytol diester, and from about 0.1 wt. % to about 1 wt. % of dodecylbenzenesulfonic acid.

Alternatively, the oil-soluble composition can comprise an alkoxylated t-butyl-nonyl phenol formaldehyde resin, an ethoxylated tallow amine, and dodecylbenzenesulfonic acid.

Further, the oil-soluble composition can comprise from about 10 wt. % to about 30 wt. % of the alkoxylated t-butyl-nonyl phenol formaldehyde resin, from about 5 wt. % to about 15 wt. % of the ethoxylated tallow amine, and from about 0.1 wt. % to about 1 wt. % dodecylbenzenesulfonic acid.

The oil-soluble composition can further comprise a limonene-containing asphaltene solvent.

Particularly, the oil-soluble composition can comprise from about 15 wt. % to about 35 wt. % of the alkoxylated t-butyl-nonyl phenol formaldehyde resin, from about 5 wt. % to about 15. wt. % ethoxylated tallow amine, from about 50 wt. % to about 80 wt. % of limonene-containing asphaltene solvent, and from about 0.1 wt. % to about 1 wt. % dodecylbenzenesulfonic acid.

Additionally, the oil-soluble composition can comprise alkoxylated t-butyl-nonyl phenol formaldehyde resin, ethoxylated tallow amine, limonene-containing asphaltene solvent, reaction product of α-olefin, maleic anhydride and pentaerithrytol, and dodecylbenzenesulfonic acid.

The oil-soluble composition can comprise from about 5 wt. % to about 25 wt. % of alkoxylated t-butyl-nonyl phenol formaldehyde resin, from about 5 wt. % to about 15 wt. % of an ethoxylated tallow amine, from about 50 wt. % to about 80 wt. % of a limonene-containing asphaltene solvent, from about 5 wt. % to about 15 wt. % of a reaction product of α-olefin, maleic anhydride and pentaerithrytol, and from about 0.1 wt. % to about 1 wt. % dodecylbenzenesulfonic acid.

Also, the oil-soluble composition can comprise an alkoxylated t-butyl-nonyl phenol formaldehyde resin, an ethoxylated tallow amine, a xylene-containing asphaltene solvent, a polyisobutylene succinic anhydride pentaerithrytol diester, and dodecylbenzenesulfonic acid.

The oil-soluble composition can comprise from about 5 wt. % to about 25 wt. % of an alkoxylated t-butyl-nonyl phenol formaldehyde resin, from about 5 wt. % to about 15 wt. % of an ethoxylated tallow amine, from about 50 wt. % to about 80 wt. % of a xylene-containing asphaltene solvent, from about 5 wt. % to about 15 wt. % of a polyisobutylene succinic anhydride pentaerithrytol diester, and from about 0.1 wt. % to about 1 wt. % dodecylbenzenesulfonic acid.

The oil-soluble composition can comprise a dinonyl-nonyl phenol formaldehyde resin, a reaction product of an alpha-olefin, maleic anhydride, and pentaerithrytol, and a xylene-containing asphaltene solvent.

Also, the oil-soluble composition can comprise from about 10 wt. % to about 20 wt. % of the dinonyl-nonyl phenol formaldehyde resin, from about 5 wt. % to about 15 wt. % of the reaction product of an alpha-olefin, maleic anhydride, and pentaerithrytol, and from about 60 wt. % to about 85 wt. % of the xylene-containing asphaltene solvent.

The oil-soluble composition can comprise a nonyl phenol formaldehyde resin, an ethoxylated tallow diamine, aromatic solvent (light diesel), and ethylene glycol monobutyl ether.

The oil-soluble composition can comprise from about 5 wt. % to about 35 wt. % nonyl phenol formaldehyde resin, from about 5 wt. % to about 15 wt. % ethoxylated tallow diamine, from about 45 wt. % to about 75 wt. % aromatic solvent, and from about 1 wt. % to about 10 wt. % ethylene glycol monobutyl ether.

The oil-soluble composition comprises an ethoxylated tallow diamine, and a solvent. The solvent can comprise a limonene-containing asphaltene solvent, an aromatic solvent, an alcohol, or a combination thereof.

For the oil-soluble compositions described herein, the aromatic solvent can comprise a medium oil, a light oil, a heavy aromatic naphtha, toluene, xylene, light diesel, quinoline, or a combination thereof.

For the oil-soluble compositions, the alcohol can comprise a glycol ether, a $C_2$-$C_8$ alcohol, or a combination thereof.

The oil-soluble composition can comprise from about 2 wt. % to about 30 wt. % of the ethoxylated tallow diamine and from about 50 wt. % to about 90 wt. % of a solvent.

The oil-soluble composition can comprise an ethoxylated tallow diamine, a reaction product reaction product of α-olefin, maleic anhydride and pentaerithrytol, and an aromatic solvent.

Further, the oil-soluble composition can comprise from about 5 wt. % to about 30 wt. % of an ethoxylated tallow diamine, from about 15 wt. % to about 35 wt. % of a reaction product reaction product of α-olefin, maleic anhydride and pentaerithrytol, and from about 50 wt. % to about 80 wt. % of an aromatic solvent.

Additionally, the oil-soluble composition can comprise an alkoxylated t-butyl phenol formaldehyde resin, an alkoxylated trimethylolpropane, and an ethoxylated tallow amine.

The oil-soluble composition can comprise from about 5 wt. % to about 20 wt. % of the alkoxylated t-butyl phenol formaldehyde resin, from about 5 wt. % to about 15 wt. % of the alkoxylated trimethylolpropane, and from about 5 wt. % to about 15 wt. % of the ethoxylated tallow amine.

The oil-soluble composition can further comprise a solvent.

Further, the solvent can comprise an aromatic solvent.

The aromatic solvent can comprise a medium oil, a light oil, a heavy aromatic naphtha, toluene, xylene, light diesel, quinoline, or a combination thereof.

Additionally, the method for enhancing the production and transportation of crude oil, the method can comprise contacting the crude oil with an oil-soluble composition, wherein the composition reduces the viscosity of the crude oil. The oil-soluble composition can comprise from about 10 wt. % to about 60 wt. % of an alkoxylated t-butyl-nonyl phenol formaldehyde resin, from about 2 wt. % to about 20 wt. % of a nonyl phenol formaldehyde resin, and further can comprise a nonyl phenol formaldehyde resin, a dinonyl-nonyl phenol formaldehyde resin, a nonyl phenyl polyetheramine, an ethoxylated tallow diamine, an ethoxylated tallow amine, a xylene-containing asphaltene solvent, a limonene-containing asphaltene solvent, a polyisobutylene succinic anhydride pentaerithrytol diester, a reaction product of α-olefin, maleic anhydride and pentaerithrytol, dodecylbenzenesulfonic acid, an aromatic solvent, an alcohol, or a combination thereof.

The oil-soluble composition can comprise from about 10 wt. % to about 60 wt. % of an alkoxylated t-butyl-nonyl phenol formaldehyde resin, from about 2 wt. % to about 20 wt. % of a nonyl phenol formaldehyde resin, from about 1 wt. % to about 10 wt. % nonyl phenyl polyetheramine, from about 15 wt. % to about 25 wt. % of a xylene-containing asphaltene solvent, from about 1 wt. % to about 7 wt. % of a polyisobutylene succinic anhydride pentaerithrytol diester, and from about 0.05 wt. % to about 0.15 wt. % of dodecylbenzenesulfonic acid.

The oil-soluble composition can comprise from about 10 wt. % to about 60 wt. % of an alkoxylated t-butyl-nonyl phenol formaldehyde resin, from about 2 wt. % to about 20 wt. % of a nonyl phenol formaldehyde resin, from about 1 wt. % to about 10 wt. % nonyl phenyl polyetheramine, from about 15 wt. % to about 25 wt. % of a limonene-containing asphaltene solvent, from about 1 wt. % to about 7 wt. % of a reaction product of α-olefin, maleic anhydride and pentaerithrytol, and from about 0.05 wt. % to about 0.15 wt. % of dodecylbenzenesulfonic acid.

Further, the oil-soluble composition comprises from about 10 wt. % to about 60 wt. % of an alkoxylated t-butyl-nonyl phenol formaldehyde resin, from about 2 wt. % to about 20 wt. % of a nonyl phenol formaldehyde resin, from about 1 wt. % to about 7 wt. % nonyl phenyl polyetheramine, and from about 15 wt. % to about 35 wt. % of a limonene-containing asphaltene solvent.

The oil-soluble composition can comprise from about 10 wt. % to about 60 wt. % of an alkoxylated t-butyl-nonyl phenol formaldehyde resin, from about 2 wt. % to about 20 wt. % of a nonyl phenol formaldehyde resin, and from about 5 wt. % to about 15 wt. % nonyl phenyl polyetheramine.

Also, the oil-soluble composition can comprise from about 10 wt. % to about 60 wt. % of an alkoxylated t-butyl-nonyl phenol formaldehyde resin, from about 2 wt. % to about 20 wt. % of a nonyl phenol formaldehyde resin, from about 1 wt. % to about 7 wt. % ethoxylated tallow amine, from about 15 wt. % to about 35 wt. % of a limonene-containing asphaltene solvent, and from about 0.05 wt. % to about 0.15 wt. % of dodecylbenzenesulfonic acid.

The oil-soluble composition can comprise from about 10 wt. % to about 60 wt. % of an alkoxylated t-butyl-nonyl phenol formaldehyde resin, from about 2 wt. % to about 20 wt. % of a nonyl phenol formaldehyde resin, from about 1 wt. % to about 7 wt. % ethoxylated tallow amine, from about 15 wt. % to about 35 wt. % of a xylene-containing asphaltene solvent, from about 1 wt. % to about 7 wt. % of a polyisobutylene succinic anhydride pentaerithrytol diester, and from about 0.05 wt. % to about 0.15 wt. % of dodecylbenzenesulfonic acid.

Further, the oil-soluble composition can comprise from about 10 wt. % to about 60 wt. % of an alkoxylated t-butyl-nonyl phenol formaldehyde resin, from about 2 wt. % to about 20 wt. % of a nonyl phenol formaldehyde resin, from about 2 wt. % to about 10 wt. % of a dinonyl-nonyl phenol formaldehyde resin, from about 15 wt. % to about 35 wt. % of a xylene-containing asphaltene solvent, and from about 1 wt. % to about 7 wt. % of a reaction product of α-olefin, maleic anhydride and pentaerithrytol.

The oil-soluble composition can comprise from about 10 wt. % to about 60 wt. % of an alkoxylated t-butyl-nonyl phenol formaldehyde resin, from about 2 wt. % to about 20 wt. % of a nonyl phenol formaldehyde resin, from about 5 wt. % to about 15 wt. % of a ethoxylated tallow diamine, and from about 15 wt. % to about 35 wt. % of a limonene-containing asphaltene solvent.

The oil-soluble composition has an activity from about 10% to about 40%, from about 10% to about 38%, from about 10% to about 35%, from about 10% to about 32%, from about 10% to about 30%, from about 10% to about 28%, from about 10% to about 25%, from about 10% to about 22%, from about 10% to about 20%, from about 15% to about 40%, from about 15% to about 38%, from about 15% to about 35%, from about 15% to about 32%, from about 15% to about 30%, from about 15% to about 28%, from about 15% to about 25%, from about 15% to about 22%, from about 15% to about 20%, from about 20% to about 40%, from about 20% to about 38%, from about 20% to about 35%, from about 20% to about 32%, from about 20% to about 30%, from about 20% to about 28%, or from about 20% to about 25%.

Also, the oil-soluble composition can be added to the crude oil at a concentration from about 50 ppm to about 15000 ppm, from about 50 ppm to about 10000 ppm, from about 50 ppm to about 9000 ppm, from about 50 ppm to about 8000 ppm, from about 50 ppm to about 7000 ppm, from about 50 ppm to about 6000 ppm, from about 50 ppm to about 5000 ppm, from about 50 ppm to about 4000 ppm, from about 50 ppm to about 3000 ppm, from about 50 ppm to about 2000 ppm, from about 50 ppm to about 1000 ppm, from about 75 ppm to about 15000 ppm, from about 75 ppm to about 10000 ppm, from about 75 ppm to about 9000 ppm, from about 75 ppm to about 8000 ppm, from about 75 ppm to about 7000 ppm, from about 75 ppm to about 6000 ppm, from about 75 ppm to about 5000 ppm, from about 75 ppm to about 4000 ppm, from about 75 ppm to about 3000 ppm, from about 75 ppm to about 2000 ppm, from about 75 ppm to about 1000 ppm, from about 100 ppm to about 15000 ppm, from about 100 ppm to about 10000 ppm, from about 100 ppm to about 9000 ppm, from about 100 ppm to about 8000 ppm, from about 100 ppm to about 7000 ppm, from about 100 ppm to about 6000 ppm, from about 100 ppm to about 5000 ppm, from about 100 ppm to about 4000 ppm, from about 100 ppm to about 3000 ppm, from about 100 ppm to about 2000 ppm, or from about 100 ppm to about 1000 ppm.

Preferably, the oil-soluble composition can be added to the crude oil at a concentration from about 100 ppm to about 1000 ppm.

The oil-soluble composition can further comprise one or more additional components including but not limited to a corrosion inhibitor, a solvent, an additional asphaltene inhibitor, a paraffin inhibitor, a scale inhibitor, an emulsifier, a dispersant, an emulsion breaker, a gas hydrate inhibitor, a biocide, a pH modifier, and a surfactant. A composition of the invention can comprise from 0 to 10 percent by weight of one or more of these additional components, based on total weight of the composition.

Suitable corrosion inhibitors for inclusion in the compositions include, but are not limited to, alkyl, hydroxyalkyl, alkylaryl, arylalkyl or arylamine quaternary salts; mono or polycyclic aromatic amine salts; imidazoline derivatives; mono-, di- or trialkyl or alkylaryl phosphate esters; phosphate esters of hydroxylamines; phosphate esters of polyols; and monomeric or oligomeric fatty acids.

Suitable asphaltene inhibitors include, but are not limited to, aliphatic sulphonic acids; alkyl aryl sulphonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

Paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable dispersants include, but are not limited to, dodecyl benzene sulfonate, oxyalkylated alkylphenols, and oxyalkylated alkylphenolic resins.

Suitable scale inhibitors include, but are not limited to, phosphates, phosphate esters, phosphoric acids, phosphonates, phosphonic acids, polyacrylamides, salts of acrylamido-methyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AMPS).

Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 nitrogen atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each nitrogen atom, at least 2 of the numbers of methylene groups in each phosphonate being different. Other suitable dispersion agents include lignin or derivatives of lignin such as lignosulfonate and naphthalene sulfonic acid and derivatives.

Suitable emulsion breakers include, but are not limited to, the sodium salt of xylenesulfonic acid (NAXSA), ethoxylated and propoxylated compounds, anionic cationic and nonionic surfactants, and resins, such as alkylphenolic and epoxide resins.

Suitable hydrogen sulfide scavengers include, but are not limited to, oxidants (e.g., inorganic peroxides such as sodium peroxide, or chlorine dioxide), aldehydes (e.g., of 1-10 carbons such as formaldehyde or glutaraldehyde or (meth)acrolein), triazines (e.g., monoethanol amine triazine, monomethylamine triazine, and triazines from multiple amines or mixtures thereof), and glyoxal.

Suitable gas hydrate inhibitors include, but are not limited to, thermodynamic hydrate inhibitors (THI), kinetic hydrate inhibitors (KHI), and anti-agglomerates (AA).

Suitable thermodynamic hydrate inhibitors include, but are not limited to, NaCl salt, KCl salt, $CaCl_2$ salt, $MgCl_2$ salt, $NaBr_2$ salt, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

Suitable kinetic hydrate inhibitors and anti-agglomerates include, but are not limited to, polymers and copolymers, polysaccharides (such as hydroxy-ethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

Suitable biocides include, but are not limited to, oxidizing and non-oxidizing biocides.

Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., bronopol and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)phosphonium sulfate (THPS)).

Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include NaOH, KOH, $Ca(OH)_2$, CaO, $Na_2CO_3$, $KHCO_3$, $K_2CO_3$, $NaHCO_3$, MgO, and $Mg(OH)_2$.

Suitable surfactants include, but are not limited to, anionic surfactants, cationic surfactants, zwitterionic surfactants, and nonionic surfactants.

Additional anionic surfactants include alkyl carboxylates and alkyl ether carboxylates, alkyl and ethoxylated alkyl phosphate esters, and mono and dialkyl sulfosuccinates and sulfosuccinamates.

Cationic surfactants include alkyl trimethyl quaternary ammonium salts, alkyl dimethyl benzyl quaternary ammonium salts, dialkyl dimethyl quaternary ammonium salts, and imidazolinium salts.

Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, alkyl polyethylene glycol esters and diesters, betaines, and sultanes. Amphoteric surfactants such as alkyl amphoacetates and amphodiacetates, alkyl amphopropionates and amphodipropionates, and alkyliminodipropionate can also be used.

The surfactant can be a quaternary ammonium compound, an amine oxide, an ionic or non-ionic surfactant, or any combination thereof.

Suitable quaternary amine compounds include, but are not limited to, alkyl benzyl ammonium chloride, benzyl cocoalkyl($C_{12}$-$C_{18}$)dimethylammonium chloride, dicocoalkyl ($C_{12}$-$C_{18}$)dimethylammonium chloride, ditallow dimethylammonium chloride, di(hydrogenated tallow alkyl) dimethyl quaternary ammonium methyl chloride, methyl bis(2-hydroxyethyl cocoalkyl($C_{12}$-$C_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, and hydrogenated tallow alkyl (2-ethylhexyl) dimethyl quaternary ammonium methyl sulfate.

The oil-soluble compositions can further include additional functional agents or additives that provide a beneficial property, such as pH adjusters or other neutralizing agents, emulsifiers, sequestrants, solubilizers, other lubricants, buffers, detergents, cleaning agents, rinse aids, preservatives, binders, thickeners or other viscosity modifiers, processing aids, foam inhibitors, defoamers, or foam generators, threshold agent or system, aesthetic enhancing agent (i.e., dye, odorant, perfume), and mixtures thereof. Additional agents or additives will vary according to the particular composition being manufactured and its intended use as one skilled in the art will appreciate.

Alternatively, the oil-soluble compositions can not contain any of the additional agents or additives.

Having described the invention in detail, it will be apparent that modifications and variations are possible without departing from the scope of the invention defined in the appended claims.

EXAMPLES

The following non-limiting examples are provided to further illustrate the present invention.

A variety of compositions were tested for their ability to reduce viscosity in the following examples. Formulations of the oil-soluble compositions and blends are listed in Tables 1 and 2, respectively.

TABLE 1

Formulation of oil-soluble compositions.

| Component code | B3 | B5 | B16 | B17 | B19 | B20 | B23 | B29 | B31 | B32 | B33 | B34 | B44 | M1 | M1C | V46V |
|---|---|---|---|---|---|---|---|---|---|---|---|---|---|---|---|---|
| A | 15 | 10 | 25 | 15 | 5 | | | 25 | 15 | 15 | 10 | | | | | |
| B | | | | | | | | | | | | | | 10 | 15 | |
| C | | | | | | | | | | | | | | 10 | 10 | |
| D | | | | | | 25 | | | | | | | | | | 25 |
| E | | | | | 15 | | 15 | 25 | | | | | | | | |
| F | 10 | | | 10 | | 10 | | 10 | | | | 25 | | | | |
| G | | 25 | | | | | | | | | | | 10 | | | 10 |
| H | | | 10 | | | | | | 10 | 10 | 10 | | | 10 | 10 | |
| I | 64.6 | | 64.6 | | 70 | | 75 | | | | 64.6 | 65 | | | | |
| J | | | | 64.6 | | 65 | | | 64.6 | 64.6 | | | | | | |
| K | | 65 | | | | | | | | | | | | | | |
| L | 10 | | | | | | | | | | 10 | | | | | |
| M | | | | 10 | 10 | | 10 | | | 10 | | | 25 | | | |
| N | 0.4 | | 0.4 | 0.4 | | | | 0.4 | 0.4 | 0.4 | 0.4 | | | | | |
| O | | | | | | | | 64.6 | | | | | | 65 | 70 | 65 | 60 |
| P | | | | | | | | | | | | | | | | 5 |

| Component code | MO91 | MO05 | MO46P3 | MO46Q4 |
|---|---|---|---|---|
| A | | | | |
| B | | 2.4 | | |
| C | | | | 1.5 |
| D | 5 | 3 | 10.7 | 7.1 |
| E | | | | |
| F | 5 | 5 | | |
| G | | | 4.3 | 2.9 |
| H | | | | |
| I | | | | |

TABLE 1-continued

| | Formulation of oil-soluble compositions. | | | |
|---|---|---|---|---|
| J | | | | |
| K | | | | |
| L | | | | |
| M | | | | |
| N | | | | |
| O | 40 | 70 | 67.9 | 72.1 |
| P | 50 | 10 | 12.1 | 16.4 |
| Q | | 9.6 | | |

Individual component description and commercial vendors are as follows: A is alkoxylated t-butyl-nonyl phenol formaldehyde resin (comprising 37.5% propylene oxide and 25% ethylene oxide), B is alkoxylated t-butyl phenol formaldehyde resin (comprising 20% mixed oxide (MO); i.e., 6.7% propylene oxide and 13.3% ethylene oxide), C is alkoxylated trimethylolpropane (comprising 52.6% propylene oxide and 45.9% ethylene oxide), D is nonyl phenol formaldehyde resin (1850-3500 Da), E is dinonyl-nonyl phenol formaldehyde resin (comprising a 50:50 ratio of dinonyl-nonyl phenol formaldehyde resin:toluene), F is nonyl phenyl polyetheramine (commercially available as JEFF-FLOW A 100 from Huntsman Corporation), G is ethoxylated tallow diamine having approximately 7 moles ethylene oxide (commercially available as Ultramina DTA70 from Oxiteno), H is ethoxylated tallow amine having approximately 8 moles ethylene oxide (commercially available as TOXIMUL® TA-8 from Stepan Co.), I a xylene-containing asphaltene solvent (commercially available from SkySpring Oil & Gas Services, Inc as asphaltene solvent SS622), J is a limonene-containing asphaltene solvent (commercially available from Huntsman Corporation as product SS222), K is a limonene-containing asphaltene solvent (commercially available from SkySpring Oil & Gas Services, Inc as asphaltene solvent SS237), L is polyisobutylene succinic anhydride pentaerithrytol diester (comprising 40% polyisobutylene succinic anhydride pentaerithrytol diester and pentaerythritol and 60% heavy aromatic naphtha), M is α-olefin succinic anhydride copolymer reacted with pentaerythritol, N is dodecylbenzenesulfonic acid, O is an aromatic solvent (i.e., medium oil, light oil, heavy aromatic naphtha, toluene, xylene, light diesel, or quinoline), P is ethylene glycol monobutyl ether or a $C_2$-$C_8$ alcohol, and Q is an alkoxylated EPON (35% EPON-PPG4000 Polycondensate and 65% MO; i.e., 42.25% propylene oxide and 22.75% ethylene oxide).

Formulations X1 (from 20 wt. % to 30 wt. % A, from 5 wt. % to 15 wt. % H, from 0.1 wt. % to 1 wt. % N, and from 60 wt. % to 70 wt. % of an aromatic solvent), X2 (from 5 wt. % to 15 wt. % A from 5 wt. % to 15 wt. % Q, and from 60 wt. % to 80 wt. % of an aromatic solvent), X3 (from 1 wt. % to 10 wt. % B, from 10 wt. % to 20 wt. % Q, from 1 wt. % to 10 wt. % D, from 15 wt. % to 35 wt. % of an aromatic solvent, and from 40 wt. % to 50 wt. % of an alcohol solvent), and X4 (commercial comparative composition) were used as a basis for comparison to the new formulations listed in Tables 1 and 2.

In addition to the formulations of Table 1, various base formulations were blended with components A and D, as listed in Table 2.

TABLE 2

| | Formulations of oil-soluble composition blends. | | | | | | | | | | | | |
|---|---|---|---|---|---|---|---|---|---|---|---|---|---|
| 30 wt. % Base | A1B3 | A2B17 | A2B20 | A4B29 | A5B34 | B1B16 | B2B31 | B3B32 | B4B33 | C1B19 | C2B23 | D1B5 | D2B44 |
| | Composition (wt. %) | | | | | | | | | | | | |
| Formulation | B3 | B17 | B20 | B29 | B34 | B16 | B31 | B32 | B33 | B19 | B23 | B5 | B44 |
| A | 60 | 60 | 60 | 60 | 60 | 60 | 60 | 60 | 60 | 60 | 60 | 60 | 60 |
| D | 10 | 10 | 10 | 10 | 10 | 10 | 10 | 10 | 10 | 10 | 10 | 10 | 10 |

Example 1. Brookfield Viscosity Measurements

Viscosity measurements were performed at a field site where heavy and extra-heavy crude oils are produced using electrical submersible pumps (ESP). The formulations of the oil-soluble compositions and blends tested are listed in Tables 1 and 2, respectively. General production characteristics of the stations at the field site are listed in Table 3.

TABLE 3

| General production characteristics. | | | | |
|---|---|---|---|---|
| Parameter/ | Oil | Water | Crude Treatment | |
| Station | (BOD) | (BWD) | API gravity | BS&W |
| 1 | 3,632 | 17,837 | 14.4 | 0.39 |
| 2 | 62,762 | 324,453 | 15.2 | 0.33 |
| 3 | 50,699 | 332,432 | 12.5 | 0.37 |
| 4 | 63,000 | 50,000 | 9.0 | 0.60 |
| Total | 117,093 | 674,722 | | |

Production fluid was obtained and drained of free water. Basic sediment and water (BS&W) was measured to be in the range of 10-14%. Crude oil was pre-heated in a water bath at 82° C. for 1-2 hours (generally 1 hour). The oil was homogenized; a sample (550 mL) was poured into six low-form glass beakers, and was left for 15 minutes to eliminate any foam that might have formed on the surface. The beakers were then immersed in a water bath at 71° C. and kept at that temperature for about 1 hr. The oil-soluble composition was added at 500 ppm to the surface of the samples and stirred with a spatula for at least five minutes. Samples were placed back in the water bath at 71° C. and kept at that temperature for 1-2 hours. If foam was observed at the surface, it was broken with a spatula.

The samples were removed from the water bath and placed in a DV-III Ultra Brookfield viscometer to measure the viscosity. The spindle and spinning rate were selected to obtain a torque value between 15% and 85%, preferably between 50% and 85% and are listed in Table 4. Temperatures were selected to mimic the treating temperatures used at the stations to obtain the dehydrated oil.

TABLE 4

Spindle and spinning rates used for viscosity measurements.

| Temperature of sample (° C.) | Spindle | Spinning rate (rpm) |
|---|---|---|
| 71 | S63 | 8 |
| 60 | S64 | 12 |

Following the measurements, the temperature at the center of the sample was measured with a thermocouple. After all six samples were measured, the water bath temperature was lowered to 60° C. and the viscosity was measured after 2 hours, or after keeping the samples in the water bath overnight. Viscosity results for the top performers are listed in Table 5.

TABLE 5

Viscosity results of top performing formulations.

| | 60° C. | | | 66° C. | | 71° C. | | |
|---|---|---|---|---|---|---|---|---|
| Formulation | η (cP) | % Δη (X1) | % Δη (Blank) | η (cP) | % Δη (Blank) | η (cP) | % Δη (X1) | % Δη (Blank) |
| BLANK | 42640 | | | 19132 | | 9040 | | |
| X1 | 31293 | | -26.6 | | | 7573 | | -16.2 |
| B5 | 32495 | 3.8 | -23.8 | 15761 | -17.6 | 8010 | 5.8 | -11.4 |
| B16 | 30694 | -1.9 | -28.0 | 14565 | -23.9 | 7252 | -4.2 | -19.8 |
| B17 | 29794 | -4.8 | -30.1 | 15065 | -21.3 | 7960 | 5.1 | -12.0 |
| B19 | 38420 | 22.8 | -9.9 | 16901 | -11.7 | 7840 | 3.5 | -13.3 |
| B20 | 36792 | 17.6 | -13.7 | 16330 | -14.7 | 7638 | 0.9 | -15.5 |
| B23 | 36460 | 16.5 | -14.5 | 15679 | -18.1 | 7120 | -6.0 | -21.2 |
| X1 | 31293 | | -26.6 | | | 7573 | | -16.2 |
| B17 | 26394 | -15.7 | -38.1 | | | 5909 | -22.0 | -34.6 |
| B29 | 26294 | -16.0 | -38.3 | | | 5834 | -23.0 | -35.5 |
| B31 | 22045 | -29.6 | -48.3 | | | 6299 | -16.8 | -30.3 |
| B32 | 20796 | -33.5 | -51.2 | | | 7093 | -6.3 | -21.5 |
| B33 | 19396 | -38.0 | -54.5 | | | 6359 | -16.0 | -29.7 |

The %Δη (X1) and %Δη (Blank) column names indicate the viscosity reduction of a formulation relative to X1 and without any additive, respectively.

Figure 1:
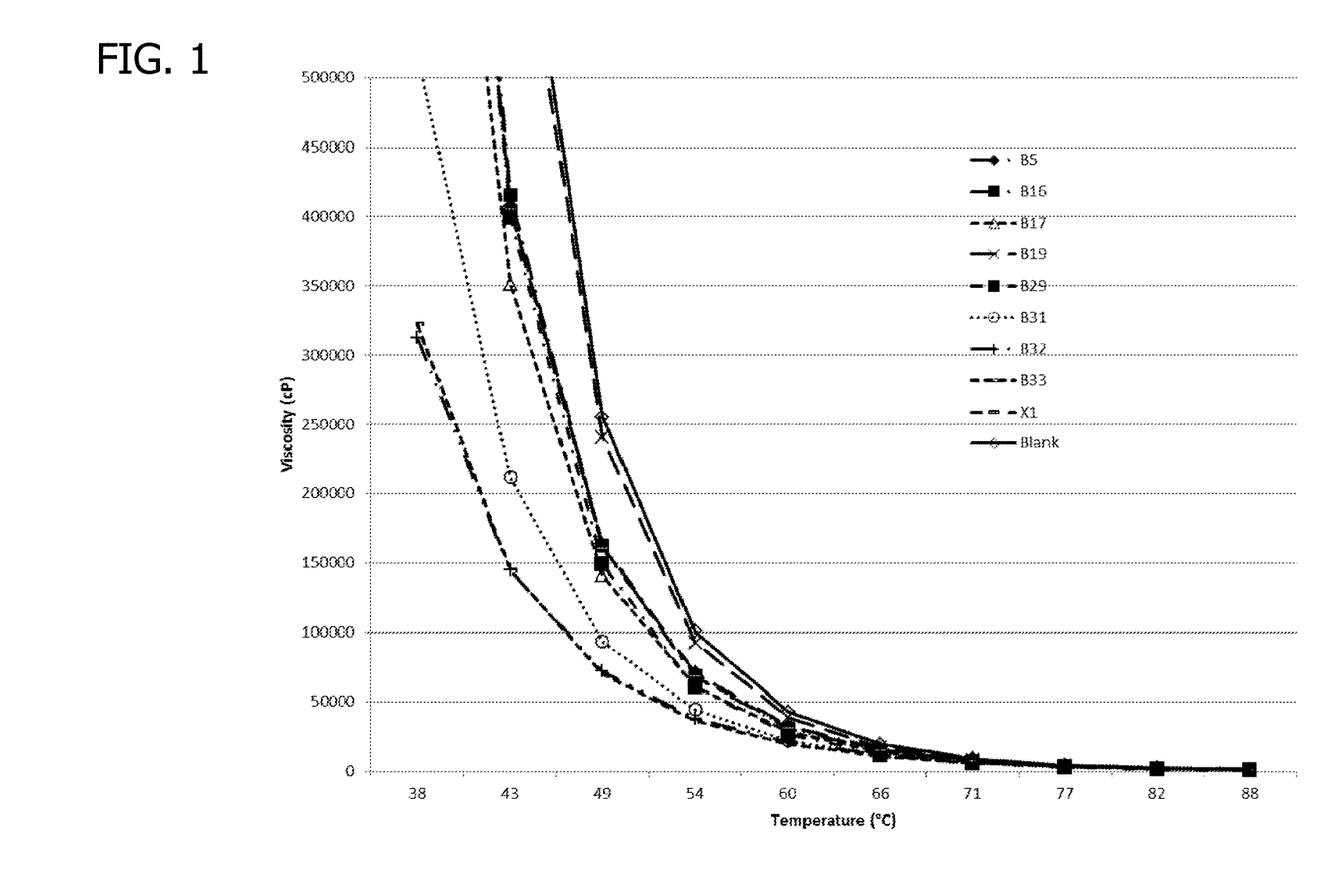
FIG. 1 is a graph of extrapolated viscosity profiles of the top performing formulations used in laboratory tests.
Figure 2:
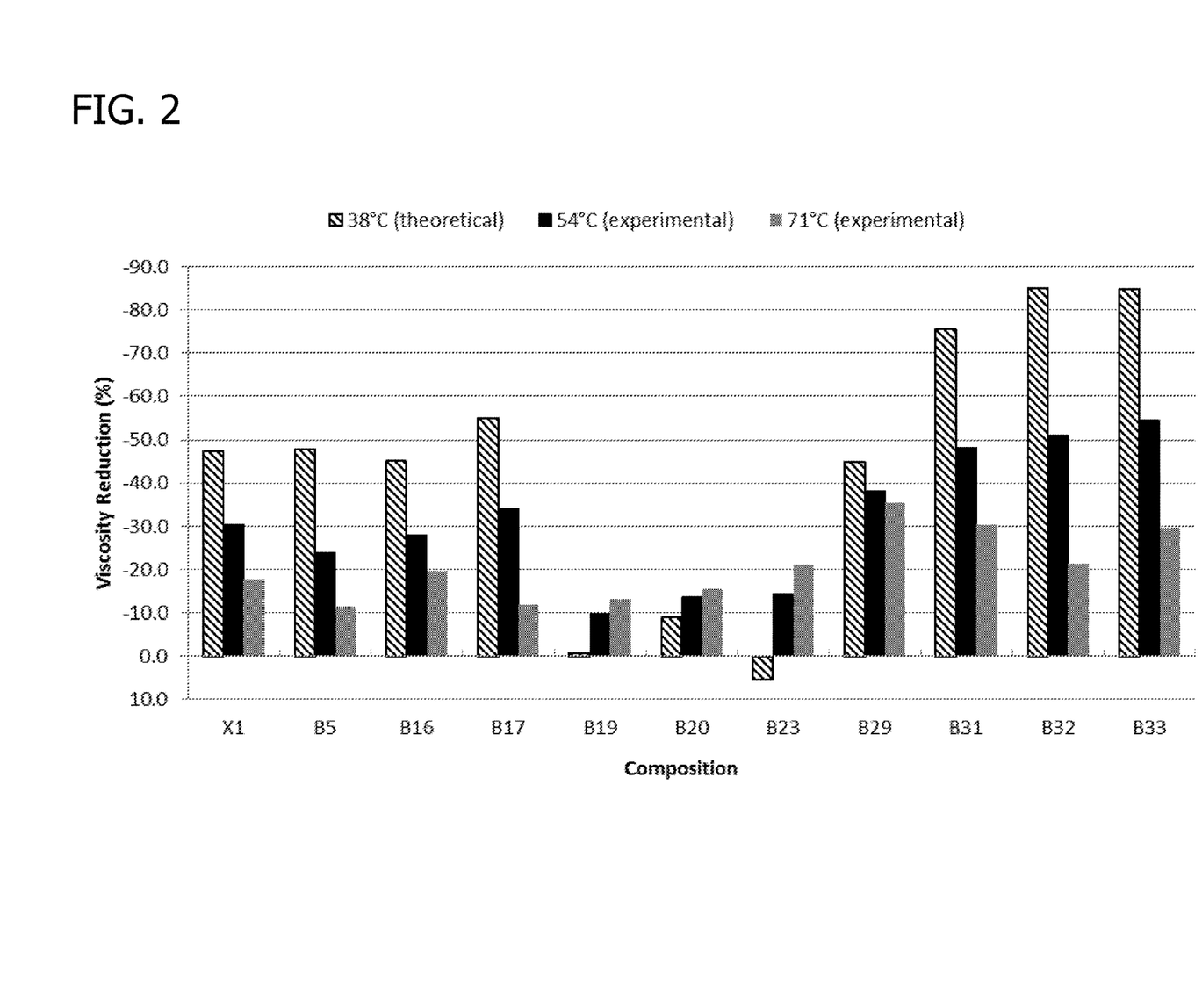
FIG. 2 is a graph of a comparison of viscosity reduction for select formulations at three different temperatures.
Figure 3A:
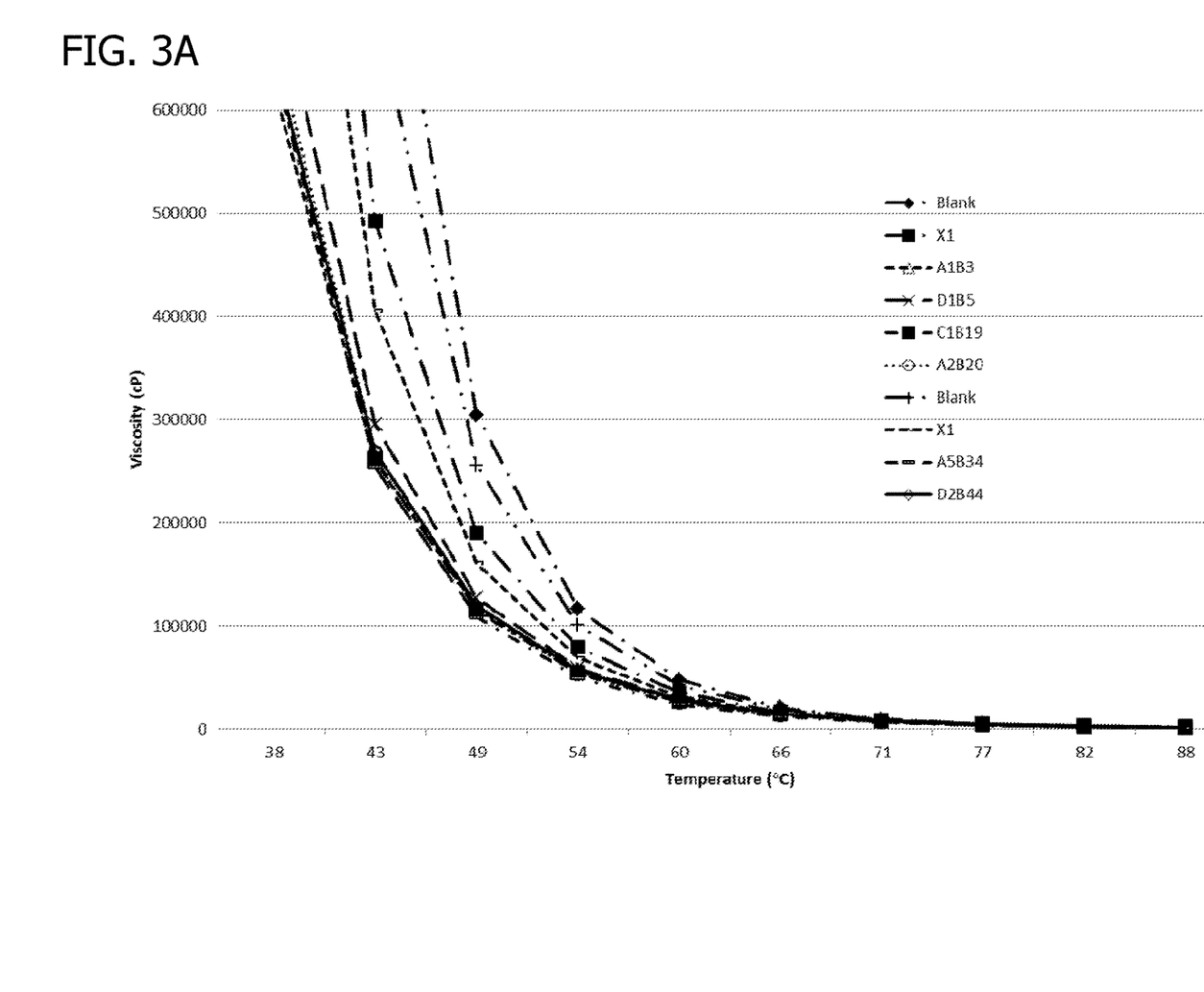
FIG. 3A is a graph of extrapolated viscosity profiles of top performing formulations blended with components A and D.
Figure 3B:
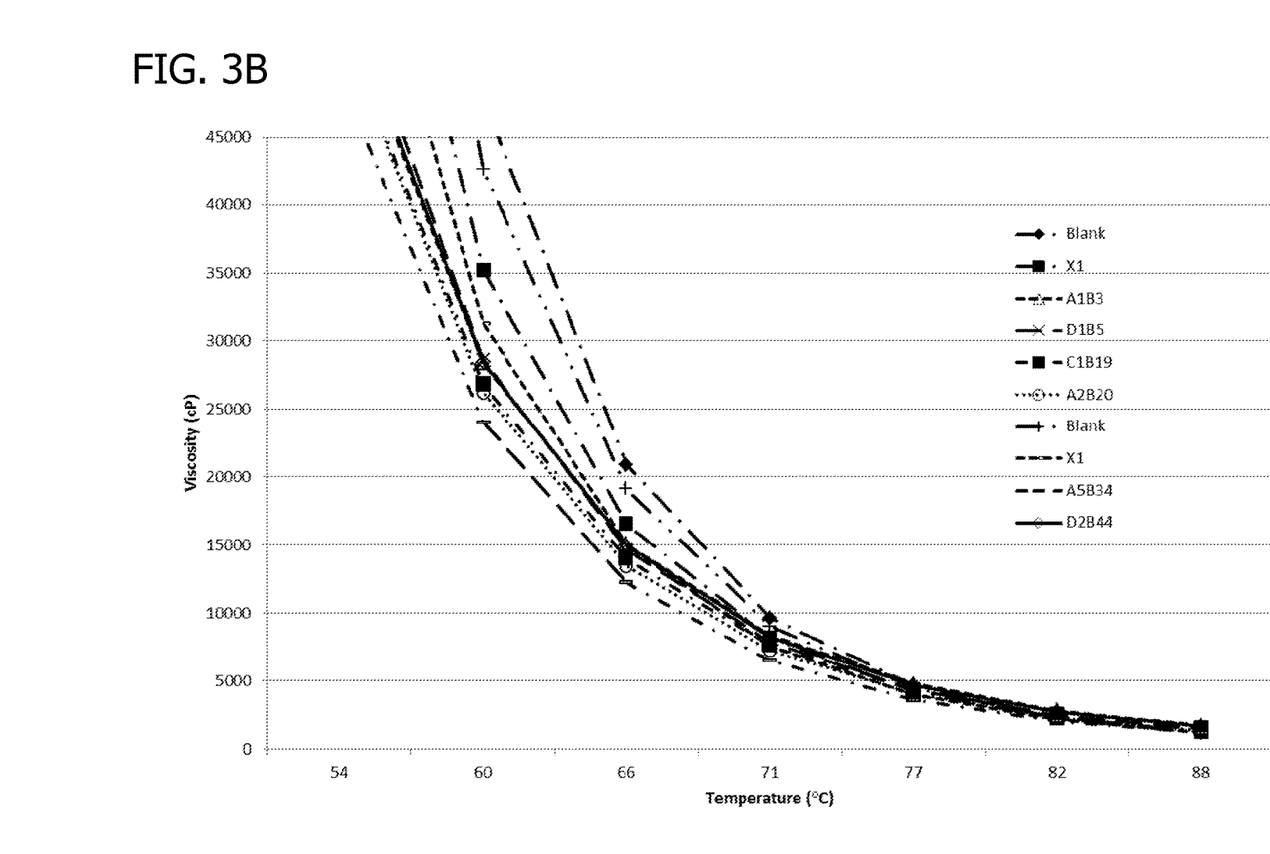
FIG. 3B is a graph of the same viscosity profiles of top performing formulations blended with components A and D as FIG. 3A with a different temperature range.
Figure 4:
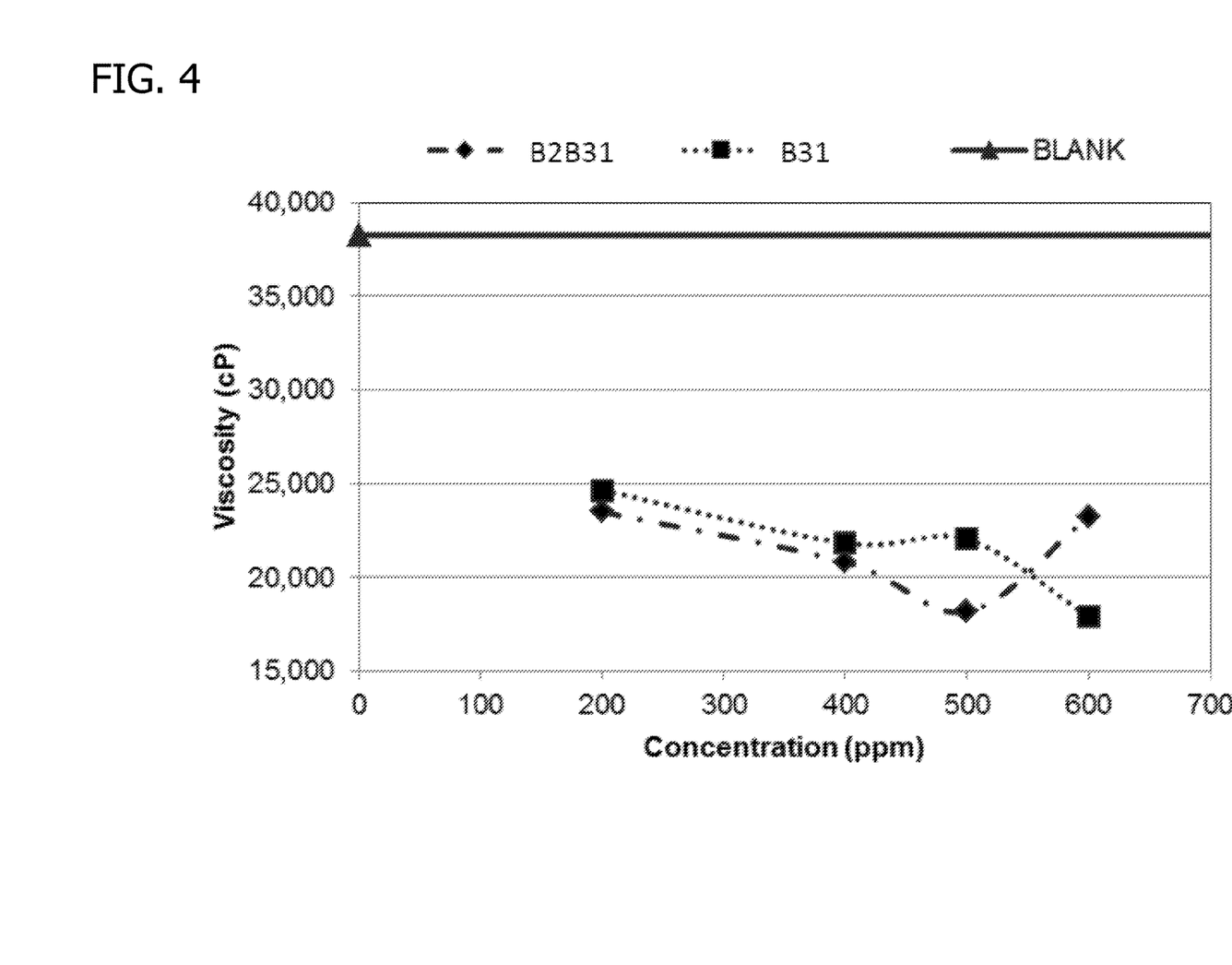
FIG. 4 is a graph of viscosity vs. concentration of formulation B31 and its corresponding blend B2B31 at 60° C.
Figure 5:
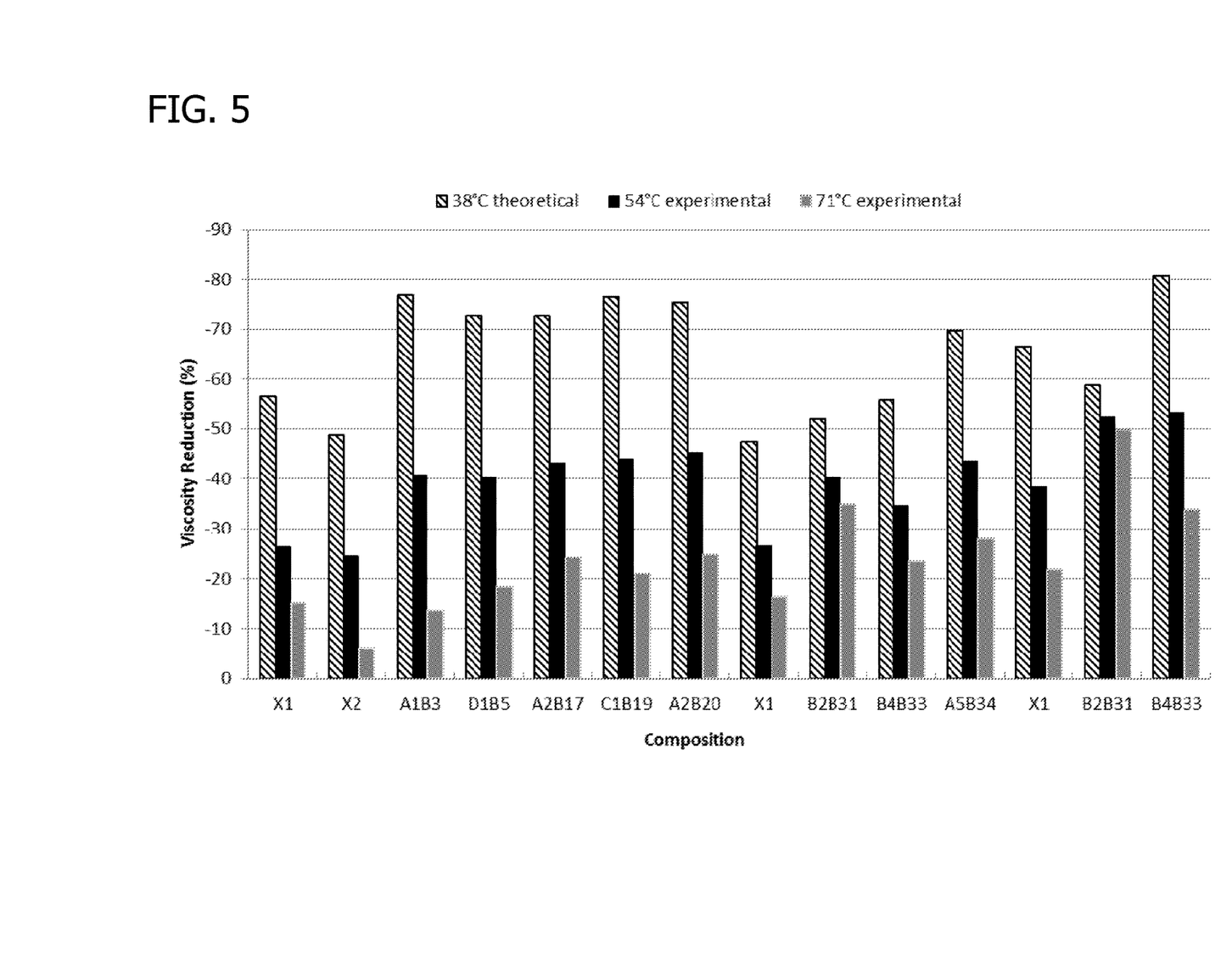
FIG. 5 is a graph of viscosity reduction profiles obtained for various formulations blended with components A and D.

Extrapolated viscosity profiles of the top performing formulations are shown in FIG. 1. Comparison of viscosity reduction of crude oil for select formulations at three temperatures is shown in FIG. 2. Extrapolated viscosity profiles for the top performing blends are shown in FIGS. 3A and 3B. The effect of concentration on viscosity for formulation B31 and its corresponding blend B2B31 is shown in FIG. 4. Comparison of viscosity reduction of crude oil for select formulation blends at three temperatures is shown in FIG. 5.

Examples 2 and 3 were obtained from a heavy oil having an API gravity lower than 16 coming from an offshore field, using electrical submersible pumps. The compositions of flow improvers tested are listed in Table 1. A SARA analysis of the heavy oils from different wells (B11, B27) is listed in Table 6.

TABLE 6

SARA analysis of oil produced at the field site.

| | (%) |
|---|---|
| Saturates | 13 |
| Aromatics | 38 |
| Resins | 24 |
| Asphaltenes | 25 |

Example 2. Viscosity Tests without Diluent

Heating and cooling profiles of blanks, where none of the oil-soluble compositions were added, were obtained as follows: free water was drained and oil was homogenized with the help of a glass rod. The oil was preheated to 40° C. and 400 g was poured in a Schott bottle. The sample in the Schott bottle was preheated to 40° C. for 30 minutes and put in a mechanical shaker at 140 spm for 30 minutes. The oil was then transferred to glass beakers. The beakers were placed in a water bath at 40° C. for 30 minutes and were covered with aluminum foil. If any foam or bubbles were observed on the surface, they were broken with a spatula.

A sample was removed from the water bath and placed in a DV-II Pro Brookfield viscometer to measure the viscosity. The spindle, S63 or S64, and spinning rate used were selected to obtain a torque value between 15% and 85%, preferably between 50% and 85%. After the measurement, the sample was placed in a water bath at 50° C. for 30 minutes and viscosity was measured again. The procedure was repeated in the following series of temperatures: 40° C., 50° C., 60° C., 70° C., and 80° C. on day 1 and 70° C., 80° C., 60° C., 50° C., and 40° C., on day 2. Temperatures were chosen to simulate operating field conditions.

For chemical screening the following procedure was performed: the oil sample was preheated at 40° C. and homogenized with a glass rod. A sample (105 mL) of oil was weighed out into a bottle. The bottles were placed in a water bath at 70° C. After 30 minutes, the corresponding amount of the oil-soluble composition was added to the surface of the liquid (equivalent to 250 ppm actives in the formulation). The bottles were placed in a mechanical shaker at 140 spm for 30 minutes. The bottles were then placed back in the water bath at 70° C. After 10 minutes, the oil was poured into glass beakers. The beakers were put in a water bath at 70° C. for 20 minutes and covered with aluminum foil. If any foam or bubbles were observed on the surface, they were broken with a spatula before the measurement. The viscosity measurement was conducted as described above. Following the measurement, the sample was placed back in a water bath at 50° C. for 30 minutes and the viscosity was measured again. The procedure was repeated in the following series of temperatures, 70° C., 60° C., 50° C., and 40° C.

Figure 6:
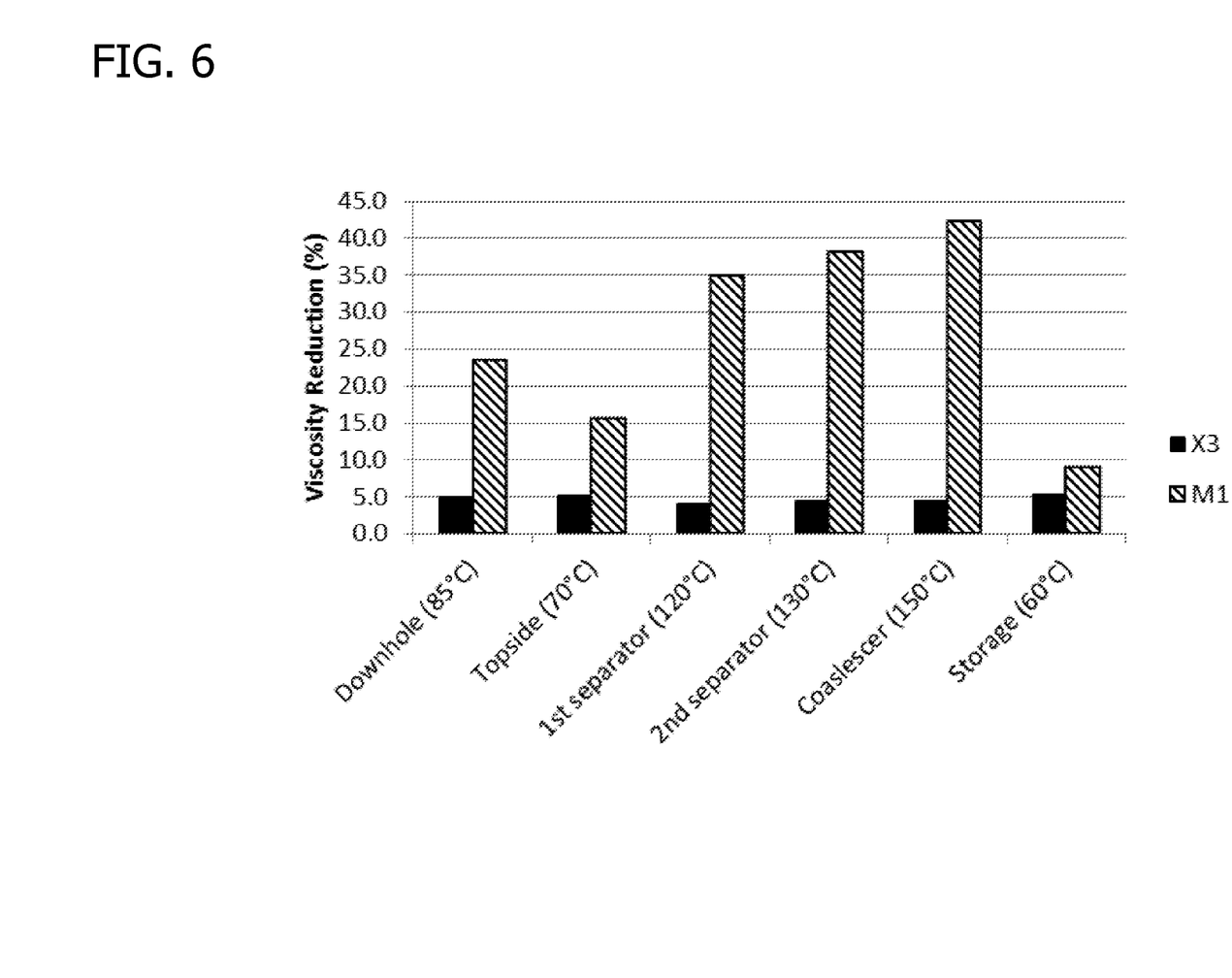
FIG. 6 is a graph of viscosity reductions at various temperatures from two formulations added to oil from B11 well.

The heating and cooling profiles were generated in the range 150-40° C., using equation (1):

$$\text{Log } \eta = M(\log + T) + C \qquad (1)$$

where $\eta$ is viscosity in cP, T is temperature in ° C., and M, C are constants. Selected temperatures for oil B11D are shown in FIG. 6.

Example 3. Viscosity Tests with Diluent

Following the initial tests in Example 2, and determining the best flow improvers, additional tests were carried out with the addition of 3% diluent (naphtha). The testing procedure followed the general methods described in Example 2 but with the following modifications.

Figure 7:
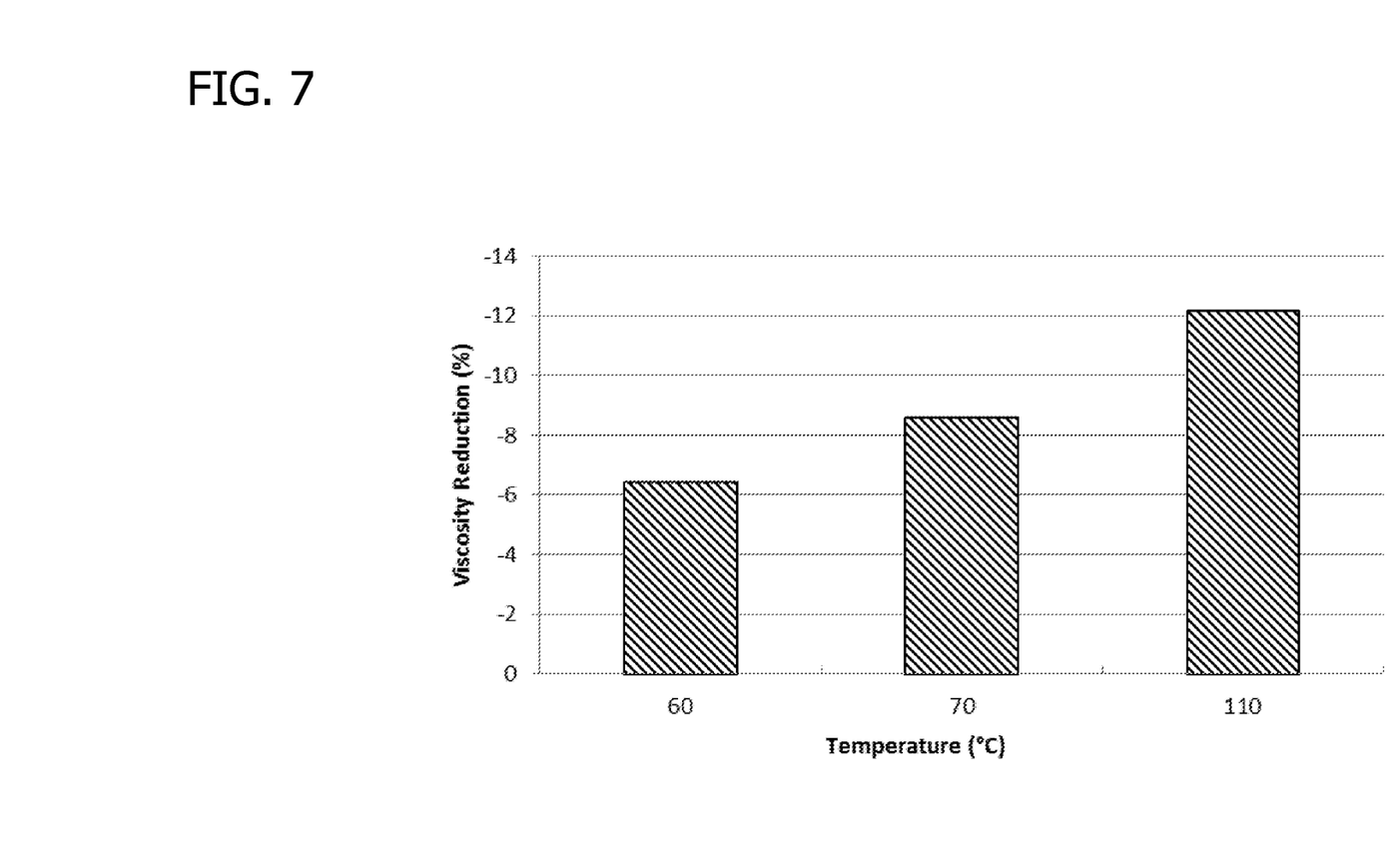
FIG. 7 is a graph of viscosity reductions at three different temperatures for oil from B27 (with 3% naphtha).

The corresponding amount of flow improver (250 ppm of actives) was added to scintillation flasks containing a known amount of naphtha and was pre-heated in an oven at 50° C. The bottles containing the oil sample were placed in a water bath at 40° C. After 30 minutes, the oil-soluble composition dissolved in the diluent was poured on the surface of the oil and the bottles were gently shaken by hand. The bottles were then placed in a mechanical shaker at 140 spm. After 30 minutes, they were put back in the water bath at 40° C. After 10 minutes, the oil was poured into glass beakers. The beakers were placed in a water bath at 40° C. for 20 minutes. They were then covered with aluminum foil. If any foam or bubbles were observed on the surface, they were broken with a spatula before the measurement. The viscosity measurements were conducted as described above. Following the measurement, the sample was put back in the water bath at 60° C. for 30 minutes and viscosity was measured again. The procedure was repeated in the following series of temperatures, 40° C., 60° C., 80° C., 60° C., 50° C., and 40° C. The viscosity reduction for oil B27D with 3% diluent at various temperatures is shown in FIG. 7.

Example 4 was obtained from a heavy oil field using an electrical submersible pump. The compositions of flow improvers tested are listed in Table 1.

Example 4: Viscosity Measurements

Production fluid was obtained and drained of free water. For chemical screening the following procedure was performed: 150 g of oil was poured into glass vessels and left for 30 minutes at the laboratory temperature of 30-33° C. The corresponding amount of the oil-soluble composition was added to the surface of the liquid (equivalent to 5000-10000 ppm of product) and stirred with a spatula for three minutes. The bottles were then left at lab temperature for 1.5 hours to eliminate any foam or bubbles formed during the mixing. The viscosity measurement was conducted as described above using a Brookfield DV II+Pro viscometer and any of spindles S6, S25 or S64 to obtain a torque value between 15% and 85%, preferably between 50% and 85%. Following the measurement, the sample was placed in a water bath at 16° C. for 60 minutes and the viscosity was measured again. Viscosity results are listed in Table 7.

TABLE 7

Viscosity results of two formulations.

| Formulation | Dosage (ppm) | Δ/blank (%) 30° C. | Δ/blank (%) 19° C. | Dosage (ppm) | Δ/blank (%) 30° C. | Δ/blank (%) 19° C. |
|---|---|---|---|---|---|---|
| X4 | 5,000 | −18 | −14 | 10,000 | −29 | −26 |
| MO91 | 5,000 | −25 | −30 | 10,000 | −35 | −39 |

When introducing elements of the present invention or the preferred embodiment(s) thereof, the articles "a", "an", "the" and "said" are intended to mean that there are one or more of the elements. The terms "comprising", "including" and "having" are intended to mean that there may be additional elements other than the listed elements.

In view of the above, it will be seen that the several objects of the invention are achieved and other advantageous results attained.

As various changes could be made in the above methods and compositions without departing from the scope of the invention, it is intended that all matter contained in the above description and shown in the accompanying figures shall be interpreted as illustrative and not in a limiting sense.

What is claimed is:

1. A method for enhancing the production or transportation of crude oil, the method comprising contacting the crude oil with an oil-soluble composition that reduces the viscosity of the crude oil,
   wherein the oil-soluble composition comprises:
   a nonyl phenyl polyetheramine and at least one of an alkoxylated t-butyl-nonyl phenol formaldehyde resin, an alkoxylated t-butyl phenol formaldehyde resin, an alkoxylated poly(bisphenol A diglycidyl ether), a nonyl phenol formaldehyde resin, or a dinonyl-nonyl phenol formaldehyde resin.

2. The method of claim 1, wherein the crude oil is heavy or extra-heavy and has an API gravity of about 5 to about 20.

3. The method of claim 1, wherein the oil-soluble composition reduces the viscosity of crude oil by from about 5% to about 65% in downstream and upstream production or in transportation pipelines as compared to an otherwise identical crude oil not contacted with the oil-soluble composition.

4. The method of claim 1, wherein the oil-soluble composition comprises from about 5 wt. % to about 25 wt. % of the alkoxylated t-butyl-nonyl phenol formaldehyde resin, from about 5 wt. % to about 15 wt. % of the nonyl phenyl polyetheramine, from about 50 wt. % to about 80 wt. % of a limonene-containing asphaltene solvent, from about 5 wt. % to about 15 wt. % of a reaction product of α-olefin, maleic anhydride and pentaerithrytol, and from about 0.1 wt. % to about 1 wt. % dodecylbenzenesulfonic acid.

5. The method of claim 1, wherein the oil-soluble composition comprises from about 5 wt. % to about 25 wt. % of the alkoxylated t-butyl-nonyl phenol formaldehyde resin, from about 5 wt. % to about 15 wt. % of the nonyl phenyl polyetheramine, from about 50 wt. % to about 80 wt. % of a xylene-containing asphaltene solvent, from about 5 wt. % to about 15 wt. % of a polyisobutylene succinic anhydride pentaerithrytol diester, and from about 0.1 wt. % to about 1 wt. % of dodecylbenzenesulfonic acid.

6. The method of claim 1, wherein the oil-soluble composition comprises from about 2 wt. % to about 15 wt. % of the nonyl phenol formaldehyde resin, from about 2 wt. % to about 15 wt. % of the alkyl phenyl polyetheramine, from about 30 wt. % to about 60 wt. % of an aromatic solvent, and from about 30 wt. % to about 70 wt. % of ethylene glycol monobutyl ether.

7. A method for enhancing the production and transportation of crude oil, the method comprising contacting the crude oil with an oil-soluble composition, wherein the composition reduces the viscosity of the crude oil, the oil-soluble composition comprises from about 10 wt. % to about 50 wt. % of an alkoxylated t-butyl-nonyl phenol formaldehyde resin, from about 2 wt. % to about 20 wt. % of a nonyl phenol formaldehyde resin; at least one of a nonyl phenyl polyetheramine, a reaction product of α-olefin, maleic anhydride and pentaerithrytol, an ethoxylated tallow amine; and further comprises, a dinonyl-nonyl phenol formaldehyde resin, an ethoxylated tallow diamine, a xylene-containing asphaltene solvent, a limonene-containing asphaltene solvent, a polyisobutylene succinic anhydride pentaerithrytol diester, dodecylbenzenesulfonic acid, an aromatic solvent, an alcohol or a combination thereof.

8. The method of claim 7, wherein the oil-soluble composition comprises from about 10 wt. % to about 50 wt. % of the alkoxylated t-butyl-nonyl phenol formaldehyde resin, from about 2 wt. % to about 20 wt. % of the nonyl phenol formaldehyde resin, from about 1 wt. % to about 10 wt. % of the nonyl phenyl polyetheramine, from about 15 wt. % to about 25 wt. % of the limonene-containing asphaltene solvent, from about 1 wt. % to about 7 wt. % of the reaction product of α-olefin, maleic anhydride and pentaerithrytol, and from about 0.05 wt. % to about 0.15 wt. % of dodecylbenzenesulfonic acid.

9. The method of claim 7, wherein the oil-soluble composition comprises from about 10 wt. % to about 50 wt. % of the alkoxylated t-butyl-nonyl phenol formaldehyde resin, from about 2 wt. % to about 20 wt. % of the nonyl phenol formaldehyde resin, from about 1 wt. % to about 7 wt. % the ethoxylated tallow amine, from about 15 wt. % to about 35 wt. % of the limonene-containing asphaltene solvent, and from about 0.05 wt. % to about 0.15 wt. % of dodecylbenzenesulfonic acid.

10. The method of claim 7, wherein the oil-soluble composition comprises from about 10 wt. % to about 50 wt. % of the alkoxylated t-butyl-nonyl phenol formaldehyde resin, from about 2 wt. % to about 20 wt. % of the nonyl phenol formaldehyde resin, from about 1 wt. % to about 7 wt. % of the ethoxylated tallow amine, from about 15 wt. % to about 35 wt. % of the xylene-containing asphaltene solvent, from about 1 wt. % to about 7 wt. % of the polyisobutylene succinic anhydride pentaerithrytol diester, and from about 0.05 wt. % to about 0.15 wt. % of dodecylbenzenesulfonic acid.

11. The method of claim 7, wherein the oil-soluble composition comprises from about 10 wt. % to about 50 wt. % of the alkoxylated t-butyl-nonyl phenol formaldehyde resin, from about 2 wt. % to about 20 wt. % of the nonyl phenol formaldehyde resin, from about 5 wt. % to about 15 wt. % of the ethoxylated tallow diamine, and from about 15 wt. % to about 35 wt. % of the limonene-containing asphaltene solvent.

12. The method of claim 7, wherein the oil-soluble composition comprises from about 10 wt. % to about 50 wt. % of the alkoxylated t-butyl-nonyl phenol formaldehyde resin, from about 2 wt. % to about 20 wt. % of the nonyl phenol formaldehyde resin, from about 1 wt. % to about 7 wt. % of the nonyl phenyl polyetheramine, and from about 15 wt. % to about 35 wt. % of the limonene-containing asphaltene solvent.

13. The method of claim 7, wherein the oil-soluble composition comprises from about 10 wt. % to about 50 wt. % of the alkoxylated t-butyl-nonyl phenol formaldehyde resin, from about 2 wt. % to about 20 wt. % of the nonyl phenol formaldehyde resin, and from about 5 wt. % to about 15 wt. % of the nonyl phenyl polyetheramine.

14. The method of claim 7, wherein the oil-soluble composition comprises from about 10 wt. % to about 50 wt. % of the alkoxylated t-butyl-nonyl phenol formaldehyde resin, from about 2 wt. % to about 20 wt. % of the nonyl phenol formaldehyde resin, from about 2 wt. % to about 10 wt. % of the dinonyl-nonyl phenol formaldehyde resin, from about 15 wt. % to about 35 wt. % of the xylene-containing asphaltene solvent, and from about 1 wt. % to about 7 wt. % of the reaction product of α-olefin, maleic anhydride and pentaerithrytol.

* * * * *

UNITED STATES PATENT AND TRADEMARK OFFICE
CERTIFICATE OF CORRECTION

PATENT NO. : 10,407,611 B2  
APPLICATION NO. : 15/400373  
DATED : September 10, 2019  
INVENTOR(S) : Duy T. Nguyen et al.

Page 1 of 1

It is certified that error appears in the above-identified patent and that said Letters Patent is hereby corrected as shown below:

In the Claims

On Column 18, Claim 4, Line 55:  
"pentaerithrytol" should read "pentaerythritol"

On Column 18, Claim 5, Line 64:  
"pentaerithrytol" should read "pentaerythritol"

On Column 19, Claim 7, Lines 15-16:  
"pentaerithrytol" should read "pentaerythritol"

On Column 19, Claim 7, Lines 20-21:  
"pentaerithrytol" should read "pentaerythritol"

On Column 19, Claim 8, Line 31:  
"pentaerithrytol" should read "pentaerythritol"

On Column 19, Claim 9, Line 38:  
"7 wt. % the" should read "7 wt. % of the"

On Column 20, Claim 10, Line 7:  
"pentaerithrytol" should read "pentaerythritol"

On Column 20, Claim 14, Line 43:  
"pentaerithrytol" should read "pentaerythritol"

Signed and Sealed this  
Twenty-second Day of December, 2020

Andrei Iancu  
*Director of the United States Patent and Trademark Office*